United States Patent
Richmond et al.

(10) Patent No.: US 6,308,286 B1
(45) Date of Patent: Oct. 23, 2001

(54) COMPLEXITY REDUCTION SYSTEM AND METHOD FOR INTEGRATED REDUNDANCY SWITCHOVER SYSTEMS

(75) Inventors: Robert L. Richmond, Gaithersburg; Paul F. Wyar, Mt. Airy, both of MD (US)

(73) Assignee: Hughes Electronics Corporation, El Segundo, CA (US)

( * ) Notice: Subject to any disclaimer, the term of this patent is extended or adjusted under 35 U.S.C. 154(b) by 1017 days.

(21) Appl. No.: 08/609,958

(22) Filed: Mar. 4, 1996

Related U.S. Application Data

(63) Continuation of application No. 08/268,937, filed on Jun. 30, 1994, now abandoned.

(51) Int. Cl.[7] .......................... H02H 3/05; H03K 19/003
(52) U.S. Cl. ................... 714/13; 714/10; 714/47
(58) Field of Search .................. 371/7, 8.1; 395/180, 395/181, 182.08, 182.09, 182.11; 364/229.4, 268, 268.3, 268.9; 714/13, 10, 11, 12, 47

(56) References Cited

U.S. PATENT DOCUMENTS

| | | | |
|---|---|---|---|
| 4,245,342 | * | 1/1981 | Entenman ........................... 371/8.1 |
| 4,385,392 | * | 5/1983 | Angell et al. ...................... 371/8.1 |
| 4,646,320 | * | 2/1987 | Krishnan ........................... 375/8 |
| 4,700,340 | | 10/1987 | Beranek et al. .................... 370/16 |
| 4,709,325 | * | 11/1987 | Yajima ........................... 395/182.08 |
| 4,965,714 | * | 10/1990 | Knecht ............................. 371/8.1 |
| 5,220,560 | | 6/1993 | Ogasawara ......................... 370/79 |
| 5,278,977 | * | 1/1994 | Spencer et al. .................... 395/575 |
| 5,345,438 | * | 9/1994 | Ozaki .............................. 370/16 |

* cited by examiner

*Primary Examiner*—Dieu-Minh Le
(74) *Attorney, Agent, or Firm*—John T. Whelan; Michael W. Sales

(57) ABSTRACT

A redundant system, such as a redundant-modem system, having a plurality of similar components capable of operating independently of each other. At least one of the components serves as a spare component. The system further includes a plurality of switches connected to the inputs and outputs of the components such that the inputs and outputs of each of the components may be rerouted through the component operating as the spare. When operating as a spare, a component monitors status information received from the other components and detects when one of the other components has failed. When one of the components has failed, the component acting as a spare controls the switches such that the spare component (20*b*) replaces the failed component.

28 Claims, 7 Drawing Sheets

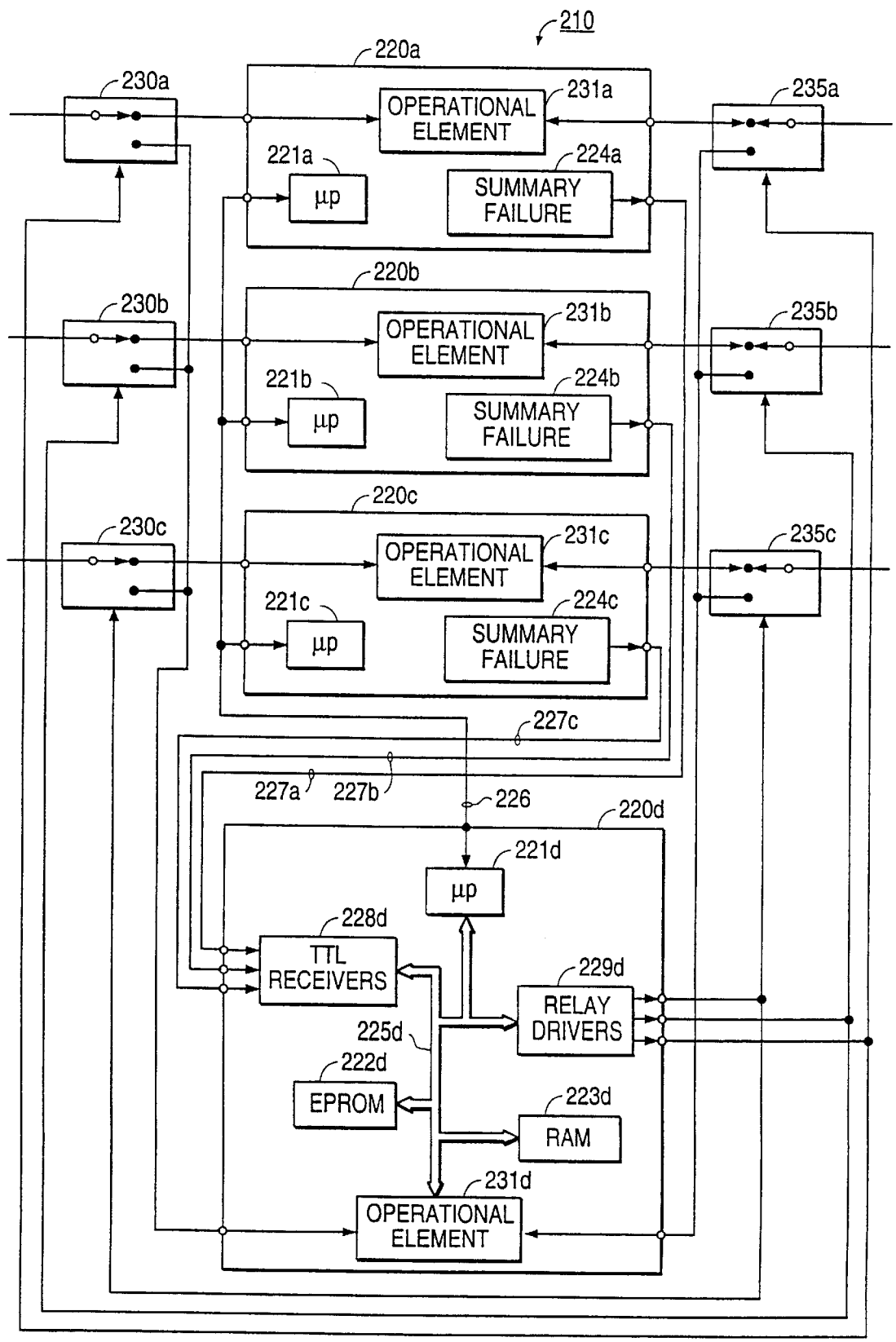

COMPLEXITY REDUCTION SYSTEM AND METHOD FOR INTEGRATED REDUNDANCY SWITCHOVER SYSTEMS

This application is a Continuation of application Ser. No. 08/268,937 filed on Jun. 30, 1994, now abandoned.

BACKGROUND OF THE INVENTION

1. Field of the Invention

The present invention relates to systems utilizing redundancy switchover control. More particularly, the present invention relates to redundant-type systems, such as a redundant-modem system, including similar independent components at least one of which monitors the others and serves as a spare component.

2. Discussion of the Related Art

In systems that require a high degree of reliability, such as redundant stand-alone satellite modem systems or redundant telephone switches, redundant components are often added to serve as a backup or spare component. Redundant stand-alone satellite modem systems typically include spare modems provided to replace a modem when it fails so as to not interrupt communications.

Generally, when a system includes a spare component, separate switches, as well as redundancy switchover control equipment, must be connected to the system. Typically, a redundancy switchover controller monitors the status of an operating component and controls switches connected to the inputs and outputs of the operating component and the spare component such that the spare component may effectively replace the operating component when a failure occurs.

To accomplish its tasks, the redundancy switchover controller and the associated switches require a multitude of connectors. From a practical standpoint, the more connectors the system requires, the more expensive the system becomes and the harder the process of connection becomes. Numerous connectors become particularly burdensome when one must replace a component, and especially burdensome should the redundancy switchover controller require replacement. Moreover, more connectors translate into more sources of possible failures.

In an effort to reduce the number of connections, some redundancy switchover controllers are housed within the same housing module as the spare component. This way, the manufacturer may make some of the required connections internally within this housing. Such an arrangement is disadvantageous in that the cost of replacing a failed spare component is higher due to the fact that it shares a housing with the redundancy switchover controller. Moreover, when the spare component requires replacement, one may have to disconnect the redundancy switchover controller from both the spare component and the other operating components. Thus, this arrangement presents a major inconvenience should the spare component fail.

Conventional redundancy switchover controllers typically include their own processors and power sources. Not only do such processors and power sources significantly add to the cost of the system, they also constitute sources of possible failure.

SUMMARY OF THE INVENTION

Accordingly, the present invention has been made in view of the above circumstances and has an advantage of having significantly increased reliablity while having significantly reduced cost.

Another feature of the present invention is that a spare component may be used to perform the redundancy switchover control functions.

A further advantage of the present invention is that redundancy switchover may be provided without requiring a separate redundancy switchover controller.

An additional feature of the present invention is that one component may be interchanged with any of the other components including the spare components.

Additional features and advantages of the invention will be set forth in part in the description which follows and in part will be apparent from the description, or may be learned by practice of the invention. The features and advantages of the invention may be realized and attained by means of the instrumentalities and combinations particularly pointed out in the written description and claims hereof as well as the appended drawings.

The present invention may be characterized in one embodiment as a system that includes a plurality of components, at least one of the components serving as a spare component; a plurality of switches connected to the components wherein each switch switches between a first state and a second state in response to a control signal, in the first state connecting a corresponding input or an output to one of the components and disconnecting the spare component from the corresponding input or output, and in the second state disconnecting the corresponding input or output from the component and connecting the spare component to the corresponding input or output; and a controller connected to the switches for monitoring status information received from the components, for detecting when one of the components has failed, and for generating the control signal to replace the failed component with the spare component. To achieve these and other advantages and in accordance with the purpose of the invention, as embodied and broadly described herein, the system of this invention comprises a plurality of similar components capable of operating independently of each other, wherein at least one of the components serves as a spare component, and a plurality of switches connected to the inputs and outputs of the components such that the inputs and outputs of each of the components may be rerouted through the spare component, wherein the spare component comprises means for monitoring the status information received from the other components and detecting when one of the other components has failed, and means for controlling the switches such that the spare component replaces a failed one of the other components.

To achieve the above and other advantages in a redundant-modem system in accordance with the present invention, the redundant-modem system of this invention comprises a plurality of identical modems capable of operating independently of each other, wherein at least one of the modems serves as a spare modem, and a plurality of switches connected to the inputs and outputs of the modems such that the input and output signals of each of the modems may be rerouted through the spare modem, wherein each of the modems comprises means for determining when the modem is to serve as a spare modem, means for monitoring status information received from the other modems when the modem is to serve as a spare modem, and for detecting when one of the other modems has failed, and means for controlling the switches when the modem is to serve as a spare modem such that the modem replaces a failed one of the other modems.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate several embodiments of the invention and, together with the description, serve to explain the objects, advantages, and principles of the invention. In the drawings.

FIG. 3 is a schematic illustration of a system constructed according to a second embodiment of the present invention;

DETAILED DESCRIPTION OF THE PREFERRED EMBODIMENTS

Reference will now be made in detail to the present preferred embodiments of the invention, examples of which are illustrated in the accompanying drawings.

Figure 1:
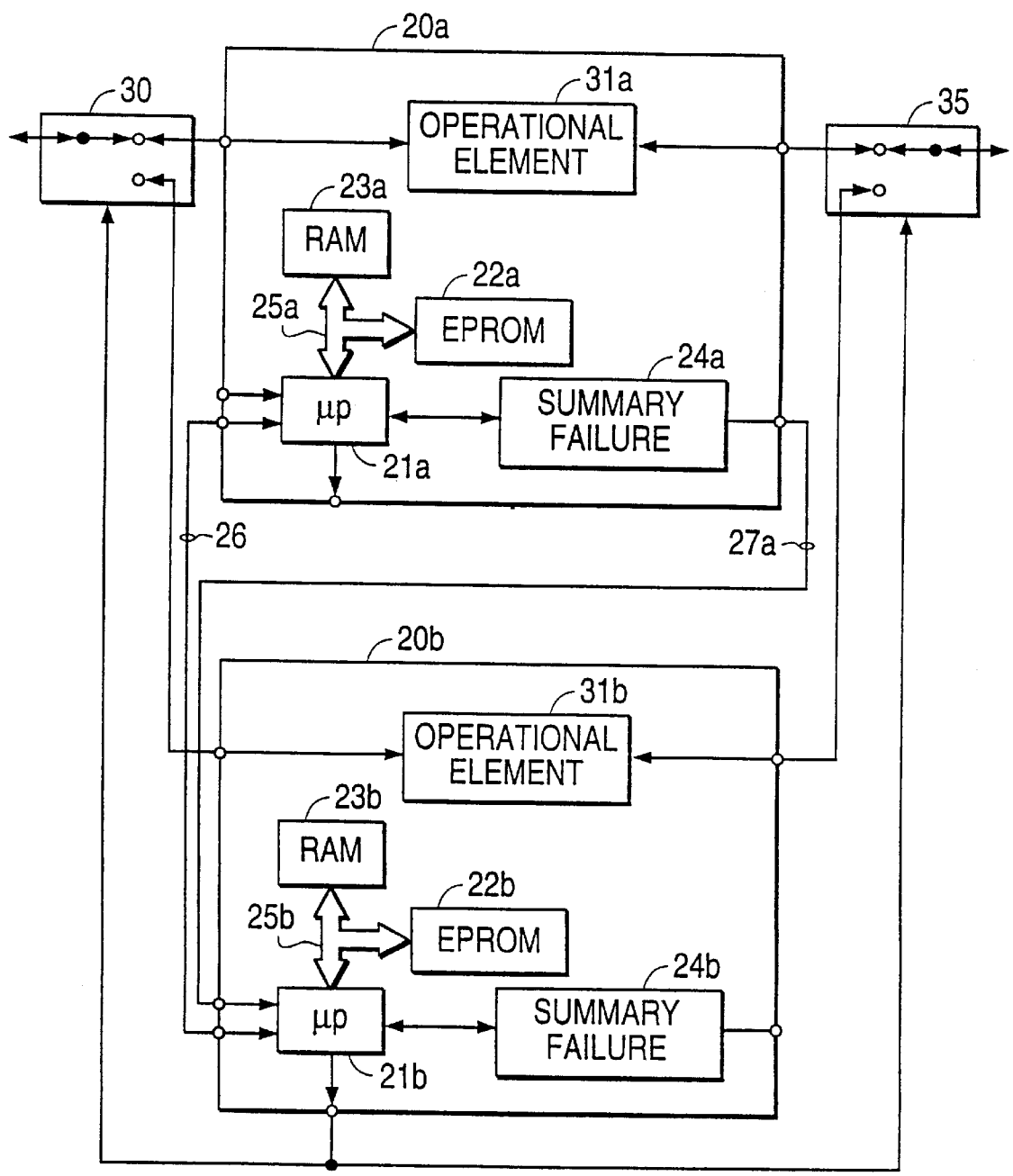
FIG. 1 is a schematic illustration of a system constructed according to a first embodiment of the present invention.

The system constructed according to the first embodiment of the present invention is shown in FIG. 1 and is designated generally by the reference numeral 10.

Generally, system 10 includes components 20a and 20b and relay switches 30 and 35. System 10 represents a 1:1 redundancy configuration wherein one of components 20a and 20b serves as an operating component (20a) while the other operates as a spare component (20b) for the one operating component. Relay switches 30 and 35 connect the inputs and outputs of components 20a and 20b such that spare component 20b can reroute the inputs and outputs of operating component 20a through spare component 20b.

Components 20a and 20b are similar to one another and, preferably, are identical in physical structure to each other. By making components 20a and 20b identical in structure, one may interchange components 20a and 20b or replace one of them using the same replacement component. Moreover, either one of components 20a or 20b may be instructed to serve as a spare for the other component.

When the system includes identical components, each component preferably determines when it is to serve as a spare component, or when it is to serve as an operating component. This may be accomplished in numerous ways. One way is to transmit an instruction to a component that it is to serve as a spare. One may manually transmit such an instruction by activating an operation mode switch or by transmitting a operation mode signal from a separate controller. The instruction may also be automatically transmitted from a separate controller.

Another manner by which a component may determine whether it is to serve as a spare, is to provide a signalling mechanism in the chassis, which houses the components. This signalling mechanism informs a component that it is to serve as a spare. When each of the components are separately implemented on single circuit cards, the chassis may have a slot for supporting each circuit card. Hence, the system may automatically designate a component as a spare by utilizing a signalling mechanism in one of the chassis slots whereby the component that a slot having the signalling mechanism supports, operates as a spare.

The preferred system utilizes the latter method while providing a manual override as described in the former method.

Once a component determines that it is a spare, the component operates in a spare mode. In the spare mode, the component monitors status information received from the other component and detects when the other component has failed. When the spare component determines that the other component has failed, the spare component controls relay switches 30 and 35 such that the spare component replaces the other component.

Preferably, each component 20a and 20b includes a microprocessor (21a, 21b), an EPROM (22a, 22b), a RAM (23a, 23b), a summary failure indicator (24a, 24b), an operational element (31a, 31b), and a bus (25a, 25b). Typically, components operating in a redundant system include microprocessors and memory for controlling the operation of the components. Thus, the present invention requires few, if any, additional physical components.

In operation, microprocessor 21b first determines that component 20b is to serve as a spare. After making this determination, microprocessor 21b enters the spare operation mode by executing instructions stored in a designated portion of EPROM 22b. In the spare mode, microprocessor 21b continuously monitors status information received from summary failure indicator 24a of operating component 20a via a status line 27a. Should a failure occur in operating component 20a, summary failure indicator 24a issues a summary failure signal, which microprocessor 21b detects. Upon detecting the summary failure signal, microprocessor 21b transmits a switch control signal causing relay switches 30 and 35 to connect component 20b and disconnect component 20a. Subsequently, microprocessor 21b enters the operating mode by executing instructions stored in another allocated portion of EPROM 22b to control operational element 31b and thereby effectuate replacement of the failed component. Operational elements 31a and 31b perform operations on, or in response to, input signals received through relay switches 30 and 35.

The present invention may be characterized by the embodiment of FIG. 1 as a system that includes a plurality of components 20, at least one of the components serving as a spare component 20b; a plurality of switches 30 and 35 connected to components 20 wherein each of switches 30 and 35 switches between a first state and a second state in response to a control signal, in the first state connecting a corresponding input or an output to one component 20a and disconnecting spare component 20b from the corresponding input or output, and in the second state disconnecting the corresponding input or output from component 20a and connecting spare component 20b to the corresponding input or output; and a controller 21b connected to switches 30 and 35 for monitoring status information received from component 20a, for detecting when component 20a has failed, and for generating the control signal to replace failed component 20a with spare component 20b. As embodied herein, "means for determining when the component is to serve as a spare component," "means for monitoring status information received from the other components when the component is to serve as a spare, and for detecting when one of the other components has failed," and "means for controlling said switches when the component is to serve as a spare such that the component replaces a failed one of the other components" preferably comprise a microprocessor such as 21a or 21b. However, these means may alternatively comprise an equivalent hard-wired implementation.

If the components are capable of operating in more than one operating mode using various configuration parameters, microprocessor 21b of spare component 20b preferably requests a current configuration profile of operating component 20a from microprocessor 21a via a multidrop 26. Upon receiving the current configuration profile via multidrop 26, microprocessor 21b stores the profile in an allocated portion of RAM 23b. Preferably, microprocessor 21b updates the configuration profile of component 20a whenever the configuration profile of component 20a changes. This may be accomplished by having microprocessor 21a inform microprocessor 21b whenever a change occurs or, preferably, by having microprocessor 21b periodically request microprocessor 21a to inform whether the configuration profile has changed. By utilizing microprocessor 21b in spare component 20b to prompt microprocessor 21a in operating component 20a for this information, the system provides a backup method for detecting a failure of operating component 20a should microprocessor 21a fail to respond to a prompt from microprocessor 21b.

By maintaining the current configuration profile of component 20a in RAM 23b, spare component 20b may immediately enter the operating mode using the same configuration profile as component 20a should component 20a fail.

Figure 2:
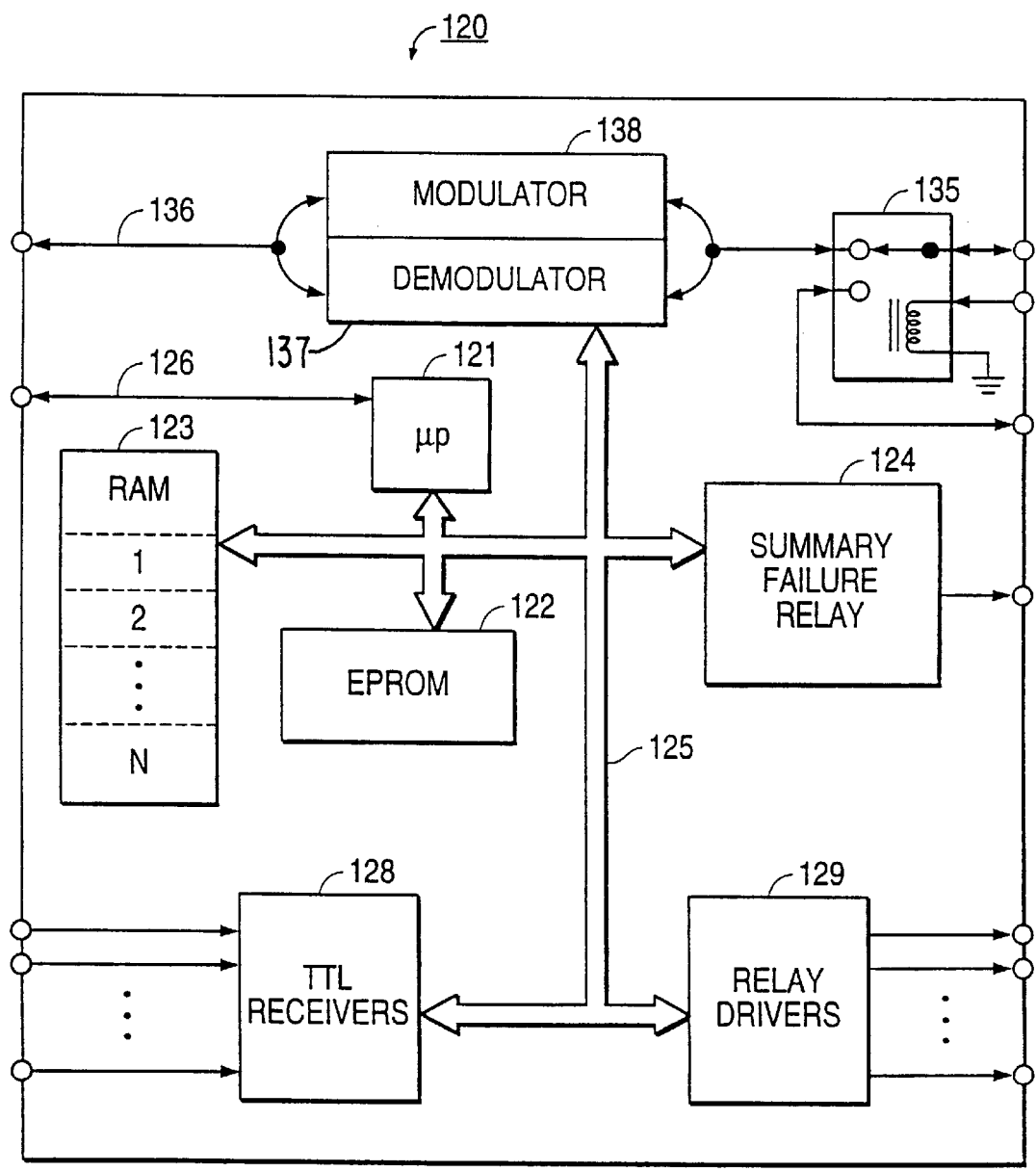
FIG. 2 is a schematic illustration of a modem constructed for use in the embodiments of the present invention.

The embodiments of the present invention are particularly useful when implemented in a redundant stand-alone satellite modem system. In such an implementation, components 20a and 20b may comprise stand-alone satellite modems. The structure of a stand-alone satellite modem useful in the present invention is shown in FIG. 2 and is designated generally by the reference numeral 120.

Modem 120 includes a microprocessor 121, a EPROM 122, a RAM 123, a summary failure relay 124, TTL receivers 128, a relay driver 129, and an operational element consisting of a demodulator 137 and a modulator 138 all of which are interconnected via a bus 125. Modem 120 may additionally incorporate relay switch 135 on the same circuit board. Relay switch 135 corresponds to relay switch 35 in FIG. 1. Likewise, relay switch 30 (no analogous switch shown in FIG. 2) may also be incorporated on the same circuit board as modem 120. Modem 120 additionally includes a baseband I/O port 136, which may be connected to relay switch 30, for analog [G.703] and digital [RS232, RS449, V.35] I/O connections.

During normal operation, microprocessor 121 controls the operation of modulator 138 and demodulator 137 by executing instructions stored in EPROM 122 and reading data stored in RAM 123. Modulator 138 and demodulator 137 perform modulation and demodulation of signals passing back and forth between a satellite antenna via RF/IF relay switch 135 and a terrestrial processor via baseband relay switch 30 connected to baseband I/O port 136. Modulator 138 and demodulator 137 may also perform various signal processing functions on the signals supplied thereto.

Summary failure relay 124 internally monitors the status of various modem elements, and issues a summary failure signal if it detects a failure.

Upon receiving an instruction to operate as a spare modem, microprocessor 121 operates in the same manner discussed above with respect to microprocessor 21b. In particular, microprocessor 121 executes instructions stored in the appropriate portion of EPROM 122 causing microprocessor 121 to monitor status line 27a to detect a summary failure signal from an operating modem by using one of TTL receivers 128 that is connected to status line 27a. Additionally, microprocessor 121 generates and transmits a polling signal via multidrop 26 to request the microprocessor of the operating modem to transmit its current operating configuration profile. Upon receiving the current operating configuration profile, microprocessor 121 stores the configuration profile in RAM 123. When modem 120 serves as a spare for more than one modem, microprocessor 121 stores the current configuration profiles for each modem in unique address areas in RAM 123 so that upon a failure of one of the modems, microprocessor 121 may immediately read out the current configuration profile of the particular modem that has failed.

When microprocessor 121 detects a failure of another modem, it instructs relay driver 129 to signal the corresponding baseband relay switch 30 and the RF/IF relay switch 135 of the failed modem to disconnect the failed modem and to connect the spare modem in its place. Microprocessor 121 reads the current configuration profile of the failed modem out of RAM 123 and subsequently enters the normal operating mode described above.

By merging the redundancy switchover control and the operation control of a modem into a single processor within the modem, the present invention eliminates the necessity of separate processors and power units of a physically separate redundancy switchover controller, as well as the numerous connections required between the redundancy switchover controller and the other modems. Because conventional stand-alone satellite modems already include processors and memory, the present invention does not require any more processors or power supplies than required by the modems themselves. The present invention not only significantly decreases the cost of a redundant stand-alone satellite modem system, but it also significantly increases the reliability of the system. The increase in reliability results directly from the significant reduction in circuitry and interconnection when a single processor in a spare modem performs redundancy switchover control.

As discussed above, using identical components in the present invention allows the components to be freely interchanged. A stand-alone satellite modem system constructed in accordance with the present invention would similarly benefit from the use of identical modems. In this way, any modem in the system may serve as either an operating on-line modem or a spare modem capable of performing redundancy switchover control.

A second embodiment of the invention will now be described with reference to FIG. 3 and is designated generally by the reference numeral 210.

Generally, system 210 includes components 220a, 220b, 220c, and 220d and relay switches 230a, 230b, 230c, 235a, 235b, and 235c. System 210 represents a 1:3 redundancy configuration wherein three of the four components serve as operating components (220a, 220b, and 220c) while the other operates as a spare component (220d) for the other three operating components. Relay switches 230a, 230b, 230c, 235a, 235b, and 235d connect the inputs and outputs of components 220a, 220b, and 220c with those of component 220d such that spare component 220d can reroute the inputs and outputs of operating components 220a, 220b, or 220c through spare component 220d.

As with the first embodiment, components 220a, 220b, 220c, and 220d are similar to one another and, preferably, are identical in physical structure to each other. By making components 220a, 220b, 220c, and 220d identical in structure, one may interchange components 220a, 220b, 220c, and 220d or replace one of them using the same replacement component.

When the system includes identical components, each component preferably determines when it is to serve as a spare component, or when it is to serve as an operating component. This may be accomplished in any of the ways discussed above with respect to the first embodiment.

Once a component determines that it is a spare, the component operates in a spare mode. In the spare mode, the component monitors status information received from the other three components and detects when one of the other components has failed. When the spare component determines that one of the other components has failed, the spare component controls the relay switches (230a, 230b, 230c, 235a, 235b, and 235c) corresponding to the failed component such that the spare component replaces the failed component.

Preferably, each component 220a, 220b, 220c, and 220d includes a microprocessor (221a, 221b, 221c, 221d), an EPROM (222d,(not shown in components 220a, 220b, and 220c)), a RAM (223d,(not shown in components 220a, 220b, and 220c)), a summary failure indicator (224a, 224b, 224c,(not shown in component 220d)), TTL receivers (228d (not shown in components 220a, 220b, and 220c)), operational element (231a, 231b, 231c, and 231d), and a bus (225d,(not shown in components 220a, 220b, and 220c)).

In operation, microprocessor 221d first determines that component 220d is to serve as a spare. After making this determination, microprocessor 221d enters the spare operation mode by executing instructions stored in a designated portion of EPROM 222d. In the spare mode, microprocessor 221d continuously monitors status information received from summary failure indicators 224a, 224b, and 224c of operating components 220a, 220b, 220c via TTL recievers 228d connected to status lines 227a, 227b, 227c. Should a failure occur in any one of operating components 220a, 220b, or 220c, the summary failure indicator thereof issues a summary failure signal, which microprocessor 221d detects. Upon detecting the summary failure signal, microprocessor 221d transmits a switch control signal to relay driver 229d causing the relay switches corresponding to the failed component to connect component 220d and disconnect the failed component. Subsequently, microprocessor 221d enters the operating mode by executing instructions stored in another allocated portion of EPROM 222d to control operational element 131d and thereby effectuate replacement of the failed component.

If the components are capable of operating in more than one operating mode using various configuration parameters, microprocessor 221d of spare component 220d preferably requests a current configuration profile of each of operating components 220a, 220b, and 220c from the corresponding microprocessor via a multidrop 226. Upon receiving the current configuration profiles via multidrop 226, microprocessor 221d stores the profiles in allocated portions of RAM 223d. Preferably, microprocessor 221d updates the configuration profiles of the other components whenever the configuration profiles change. This may be accomplished by having microprocessor 221d periodically poll each microprocessor of the other components to request them to inform microprocessor 221d whether their configuration profiles have changed. By utilizing microprocessor 221d in spare component 220d to prompt microprocessors 221a, 221b, and 221c in the other components for this information, the system provides a backup method for detecting a failure of an operating component should one of the microprocessors fail to respond to a prompt from microprocessor 221d.

By maintaining the current configuration profiles of the other components 220a, 220b, and 220c in RAM 223d, spare component 220d may immediately enter the operating mode using the same configuration profile as the failed component.

Like the first embodiment, the second embodiment of the present invention as shown in FIG. 3, is particularly useful when implemented in a redundant stand-alone satellite modem system. In such an implementation, components 220a, 220b, 220c, and 220d may comprise stand-alone satellite modems, such as that shown in FIG. 2.

In a redundant stand-alone satellite modem system constructed in accordance with the second embodiment of the present invention, modem 120 operating as spare component 220d, stores in RAM 123, the configuration profiles of modems 220a, 220b, and 220c received via multidrop 226, and monitors the status of modems 220a, 220b, and 220c via corresponding status lines 227a, 227b, and 227c.

To communicate with the other microprocessors via multidrop 226, microprocessor 121 utilizes ID codes uniquely assigned to each of the other processors.

A third embodiment of the invention will now be described with reference to FIGS. 4 and 5 and is designated generally by the reference numeral 310.

Generally, system 310 includes nine components 320a, 320b, 320c, 320d, 320e, 320f, 320g, 320h, and 320i and may optionally include a tenth component 320j. Additionally, system 310 includes relay switches 330a–h, 330j, and a relay power switching circuit 340. System 310 represents either a 1:8 redundancy configuration wherein one component (320i) serves as a spare for the other eight operating components (320a–h), or a dual 1:4 configuration wherein an additional component (320j), which is inserted into the chassis housing the system, serves as a spare for four (320a–d) of the eight operating components while component 320i serves as the spare for the remaining four operating components (320e–h). Relay switches 330e–h connect inputs and outputs of components 320e–h with those of spare component 320i. Relay switches 330a–d connect inputs and outputs of components 320a–d with those of either spare component 320i or spare component 320j. In the 1:8 redundancy configuration, relay switches 330a–j operate such that spare component 320i can reroute the inputs and outputs of any one of operating elements 331a–h of operating components 320a–h through operating element 331i of spare component 320i. In the dual 1:4 redundancy configuration, relay switches 330a–j and operate such that spare component 320j can reroute the inputs and outputs of any one of operating elements 331a–d of operating components 320a–d through operating element 331j of spare component 320j and spare component 320i can reroute the inputs and outputs of any one of operating elements 331e–h of operating components 320e–h through operating element 331i of spare component 320i.

Relay switches 330 may be incorporated into components 320.

Relay switches 330a–h and 330j are multiple sets of relays shown in a relay bank 350, which may be located in the backplane of the chassis housing the system. Relay bank 350 includes relay power switching circuit 340 for driving switches 330a–h and 330j in response to output signals from relay drivers 329i and 329j and from summary failure indicators 324i and 324j.

Figure 4A:
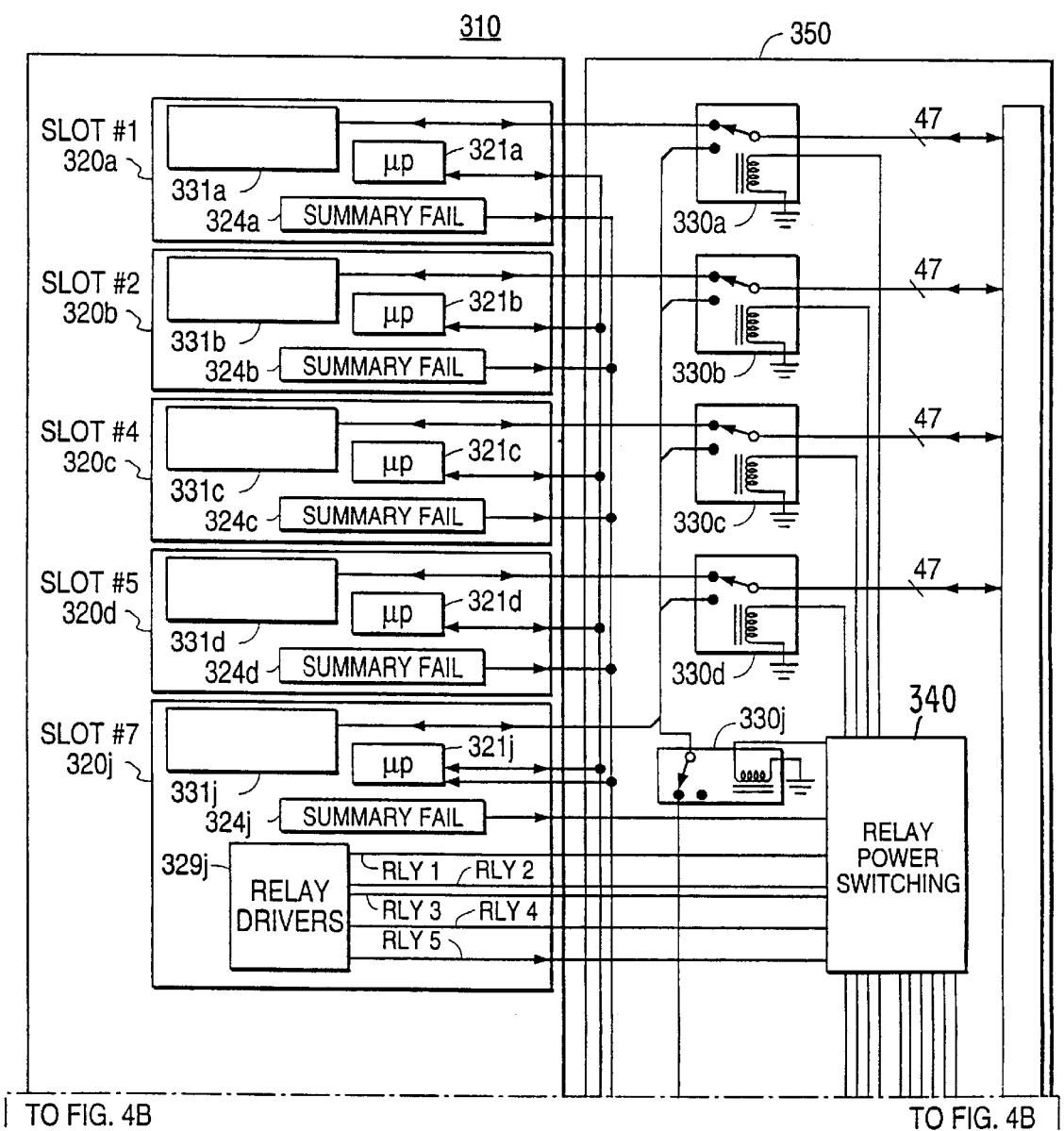
FIG. 4 is a schematic illustration of a system constructed according to a third embodiment of the present invention.
Figure 4B:
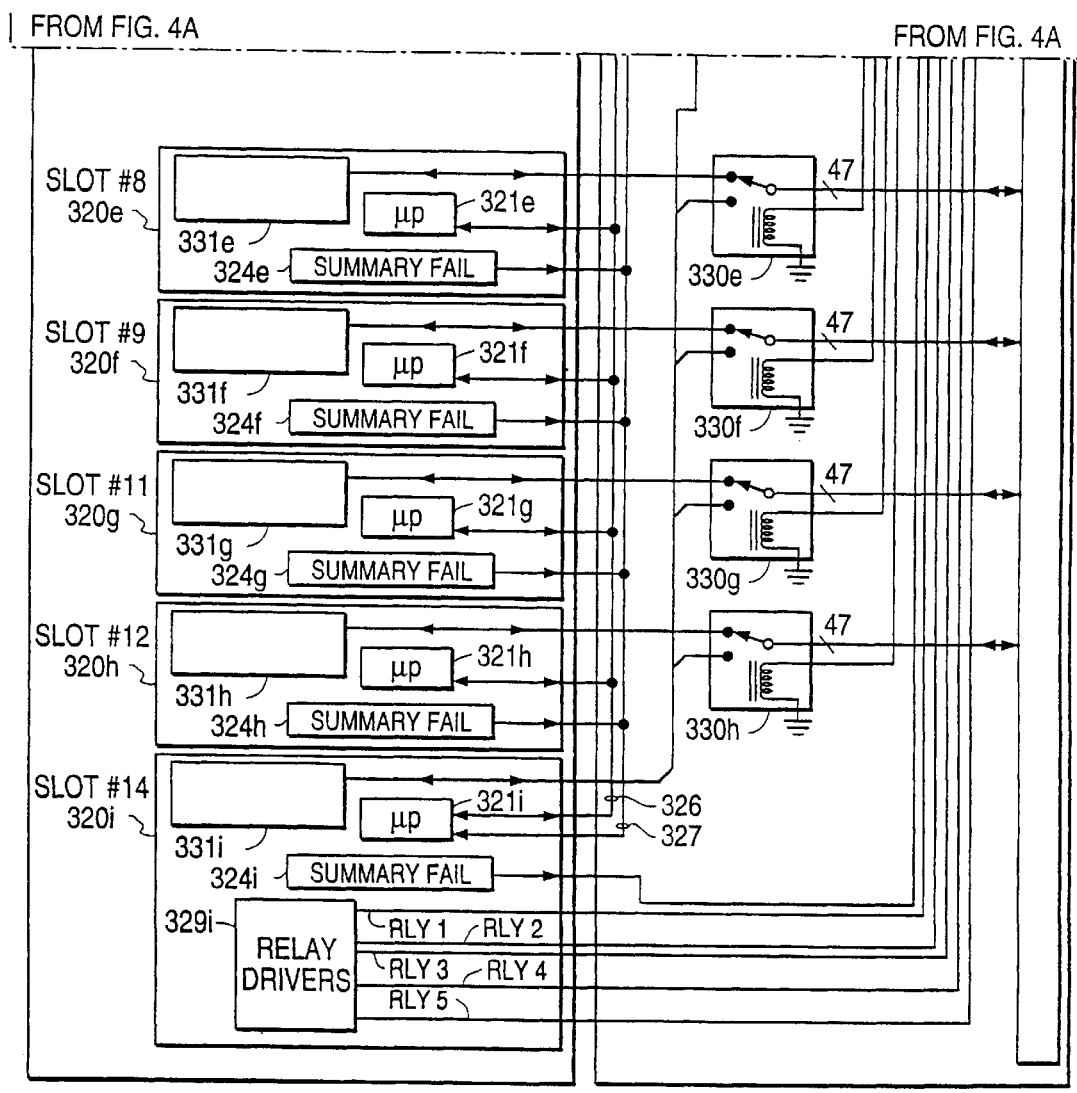
Figure 5:
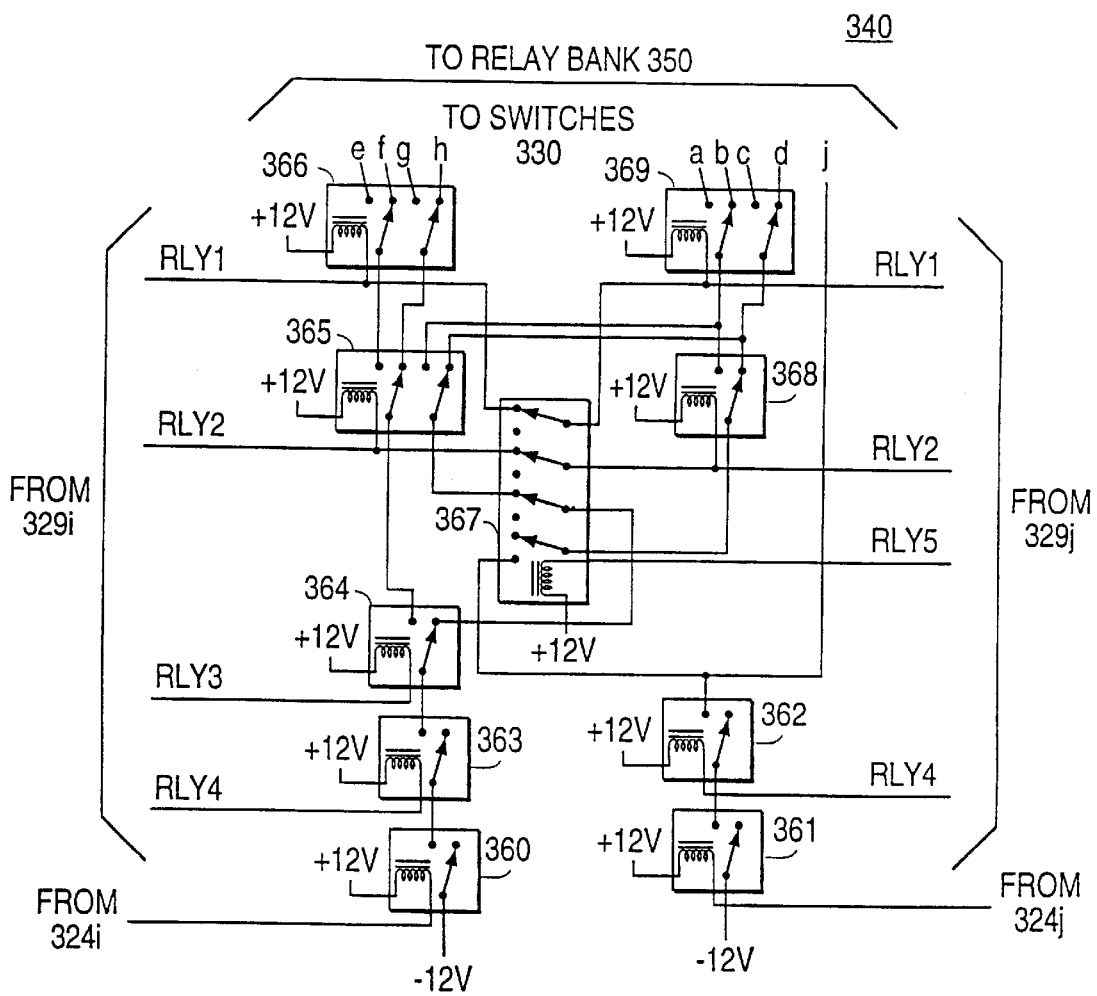
FIG. 5 is a schematic illustration of a relay power switching circuit useful in the third embodiment of the present invention.

FIG. 5 shows the details of an exemplary relay power switching circuit 340. Relay power switching circuit 340 includes relay switches 360–369. Relay switches 360 and 361 receive device present signals transmitted from summary failure indicators 324i and 324j, respectively. Should spare component 320j not be present or working properly, relay switch 361 effectively maintains switch 330j in the position shown in FIG. 4 such that spare component 320i serves as a spare for operating components 320a–d as well as components 320e–h. Moreover, the absence of signal RLY5 from relay driver 329j permits relay driver 329i to control switches 330a–d via relay switches 363, 364, 367, 365, and 369. On the other hand, when component 320j is present, relay power switching circuit 340 receives a device present signal from summary failure indicator 324j and a signal from relay driver 329j causing relay switches 361 and 362 to signal relay switch 330j to disconnect the signal transmission line of component 320i from relay switches 330a–d. When relay power switching circuit 340 receives a RLY5 signal from relay driver 329j, relay switch 367 prevents relay driver 329i from sending control signals to relay switches 330a–d. Thus, when component 320j is present, component 320i controls relay switches 330e–h via relay switches 363, 364, 365, and 366 and component 320j controls relay switches 330a–d via relay switches 362, 368, and 369.

Figure 6:
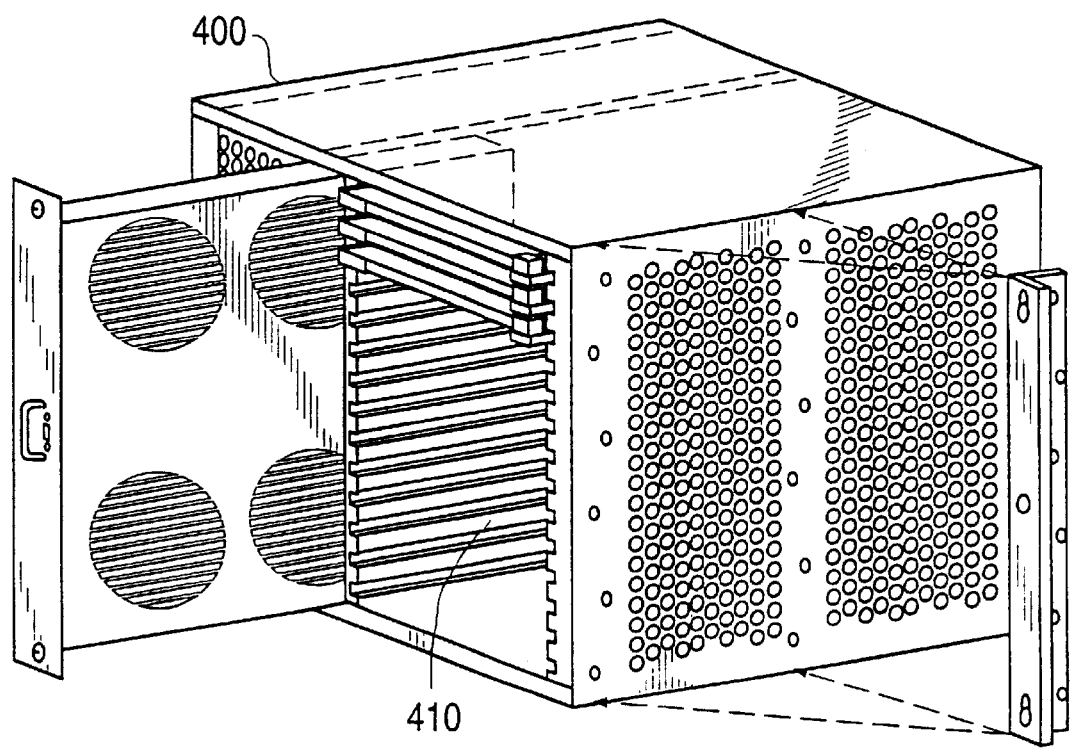
FIG. 6 is a pictorial representation of a chassis for housing the embodiments of the present invention.

FIG. 6 shows an example of a chassis 400 for housing a system constructed in accordance with the third embodiment of the present invention. Chassis 400 includes a plurality of slots 410 for supporting circuit cards each having a component 320 provided thereon. Some of slots 410 designate the circuit cards inserted therein as spares, while the remaining slots designate circuit cards inserted therein as operating components. The designation of a circuit card to serve as either a spare or an operating component may be implemented by hard-wiring a connector within the slot that contacts the circuit card in such a manner that the component on the card recognizes the role it is designated to take.

Like the first and second embodiments, the third embodiment of the present invention as shown in FIG. 4, is particularly useful when implemented in a redundant stand-alone satellite modem system. In such an implementation, components 320a–j may comprise stand-alone satellite modems, such as that shown in FIG. 2.

The above described embodiments include 1:1, 1:3, and 1:8/dual 1:4 redundancy configurations. It should be understood that the present invention is not limited to these exemplary redundancy configurations, but may be implemented in any M:N redundancy configuration.

Although the preferred embodiments are described above as being applicable to redundant stand-alone satellite modem systems, it will be appreciated that the present invention is not limited to such a specific application, rather the present invention may be applied to any system that may benefit from the use of such a built-in redundancy switchover control. An additional example of such a system that would benefit from the present invention is a telephone switching system.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A system comprising:
    a plurality of components, at least one of the plurality of components serving as a spare component;
    a plurality of switches connected to the components wherein each of the plurality of switches switches between a first state and a second state in response to a control signal;
    in the first state connecting a corresponding input or an output to one of the plurality of components and disconnecting the spare component from the corresponding input or output; and
    in the second state disconnecting the corresponding input or output from the one of the plurality of components and connecting the spare component to the corresponding input or output;
    and wherein the plurality of components comprises a controller connected to the plurality of switches for monitoring status information received from the plurality of components, for detecting when one of the plurality of components has failed, and for generating the control signal to replace the one of the plurality of components that has failed with the spare component.

2. The system of claim 1, wherein said components are signal processors.

3. The system of claim 1, wherein said components are modems.

4. The system of claim 1, wherein said components are stand-alone satellite modems.

5. The system of claim 1, wherein said spare component further comprises:
    a memory for storing current operating configurations of each of the other components, which are provided in status information transmitted to said spare component from the other components,
    wherein said controller reads the current operating configuration for a failed one of the other components from said memory and implements the operating configuration in said spare component.

6. The system of claim 5, wherein said controller generates and transmits a polling signal to the other components to request updates of current operating configurations.

7. The system of claim 1, wherein the plurality of components include two spare components, such that each spare component serves as a spare for a separate group of the other components.

8. A redundant-modem system comprising:
    a plurality of modems, at least one of said modems serving as a spare modem; and
    a plurality of switches connected to the inputs and outputs of said modems such that the input and output signals of each of said modems may be rerouted through said spare modem,
    wherein each of said plurality of modems comprises a single controller for (i) monitoring status information received from the other modems, (ii) detecting when one of the other modems has failed, and (iii) controlling said switches such that said spare modem replaces a failed one of the other modems.

9. The redundant-modem system of claim 8, wherein said modems are stand-alone satellite modems.

10. The redundant-modem system of claim 8, wherein said spare modem further comprises:
  a memory for storing current operating configurations of each of the other modems, which are provided in the status information transmitted to said spare modem from the other modems,
  wherein said controller reads the current operating configuration for a failed one of the other modems from said memory and implements the operating configuration in said spare modem.

11. The redundant-modem system of claim 10, wherein said controller generates and transmits a polling signal to the other modems to request current operating configurations of each of the other modems.

12. The redundant-modem system of claim 8, wherein the plurality of modems include two spare modems, which serve as spares for two mutually exclusive groups of the other modems.

13. The redundant-modem system of claim 8, wherein said plurality of switches include a plurality of baseband switches and a plurality of IF switches.

14. The redundant-modem system of claim 8, wherein said plurality of switches include a plurality of baseband switches and a plurality of RF switches.

15. The redundant-modem system of claim 8, further comprising a chassis for housing said modems.

16. The redundant-modem system of claim 15, wherein said plurality of modems including said at least one spare modem are identical in physical structure, said chassis includes a plurality of slots for supporting said modems, and wherein said plurality of slots include at least one slot that designates the modem supported therein as a spare modem.

17. The redundant-modem system of claim 16, wherein said chassis includes at least ten slots for supporting said modems, at least two of said slots designate the modem supported therein as a spare modem, and said redundant-modem system operates in a dual 1:4 redundant configuration when modems are placed in the two slots for supporting spare modems, and operates in a 1:8 redundant configuration when only one modem is placed in one of the two slots for supporting spare modems.

18. The redundant-modem system of claim 8, wherein said plurality of modems including said at least one spare modem are identical in physical structure.

19. A system comprising:
  a plurality of components, at least one of said components serving as a spare component; and
  a plurality of switches connected to the inputs and outputs of said components such that the inputs and outputs of each of said components may be rerouted through the component serving as a spare,
  wherein each of said plurality of components comprises a single controller for (i) determining when the component is to serve as a spare component, (ii) monitoring status information received from the other components when the component is to serve as a spare, (iii) detecting when one of the other components has failed, and (iv) controlling said switches when the component is to serve as a spare such that the component replaces a failed one of the other components.

20. The system of claim 19, further comprising a chassis for housing said components, said chassis including a plurality of slots for supporting said components, wherein said plurality of slots include at least one slot that designates the component supported therein as a spare component, and wherein said controller determines that the component is to serve as a spare when the component is placed in a slot designated for a spare.

21. The system of claim 19, wherein said components are modems.

22. A system comprising:
  a plurality of components, wherein each component comprises different parameters and at least one of said components serves as a spare component; and
  a plurality of switches connected to the inputs and outputs of said components such that the inputs and outputs of each of said components may be rerouted through said spare component,
  wherein each of said plurality of components comprises a single processor for (i) monitoring status information received from the other components, (ii) detecting when one of the other components has failed, (iii) controlling said switches such that said spare component replaces a failed one of the other components, and (iv) configuring all parameters of the spare component to be identical to all parameters of the replaced failed component.

23. The system of claim 22, wherein said components are signal processors.

24. The system of claim 22, wherein said components are modems.

25. The system of claim 22, wherein said components are stand-alone satellite modems.

26. The system of claim 22, wherein said spare component further comprises:
  a memory for storing current operating configurations of each of the other components, which are provided in status information transmitted to said spare component from the other components,
  wherein said processor reads the current operating configuration for a failed one of the other components from said memory and implements the operating configuration in said spare component.

27. The system of claim 26, wherein said processor generates and transmits a polling signal to the other components to request updates of current operating configurations.

28. The system of claim 22, wherein the plurality of components include two spare components, such that each spare component serves as a spare for a separate group of the other components.

* * * * *